No. 764,104. PATENTED JULY 5, 1904.
T. W. BARBER.
FRICTION CLUTCH.
APPLICATION FILED APR. 3, 1903.
NO MODEL. 5 SHEETS—SHEET 1.
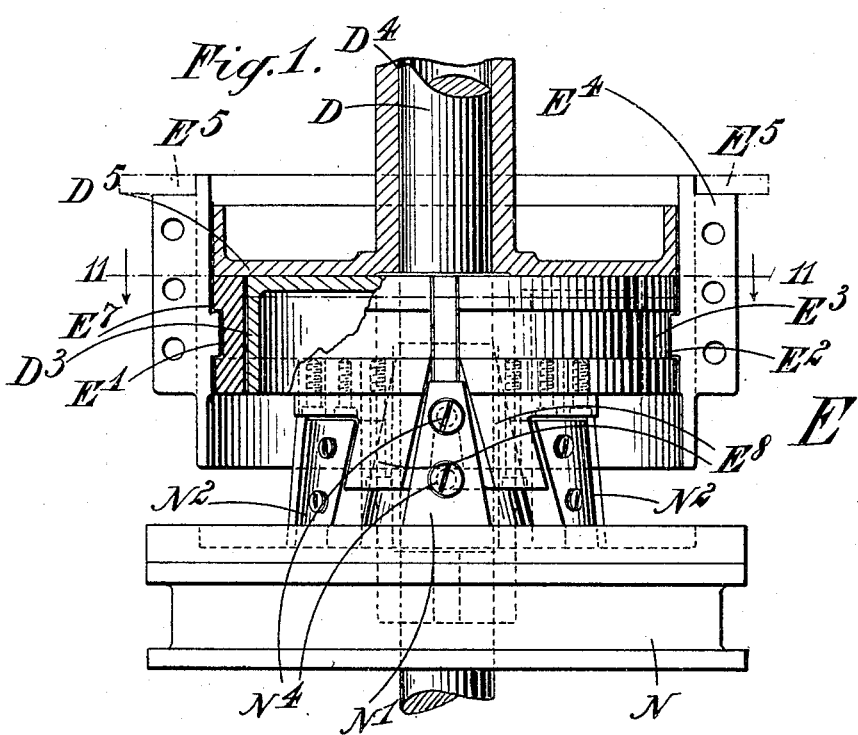

No. 764,104. PATENTED JULY 5, 1904.
T. W. BARBER.
FRICTION CLUTCH.
APPLICATION FILED APR. 3, 1903.
NO MODEL. 5 SHEETS—SHEET 2.
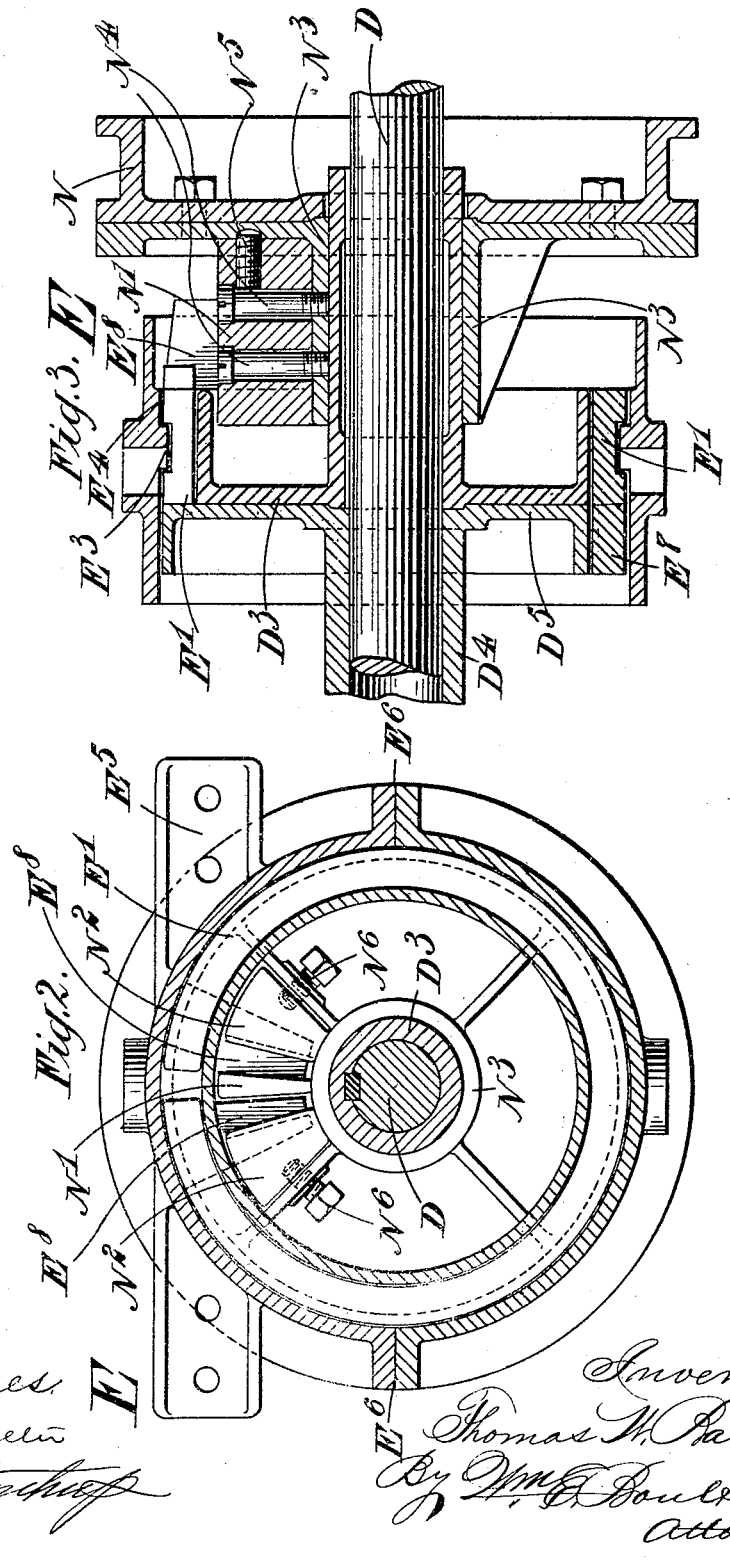

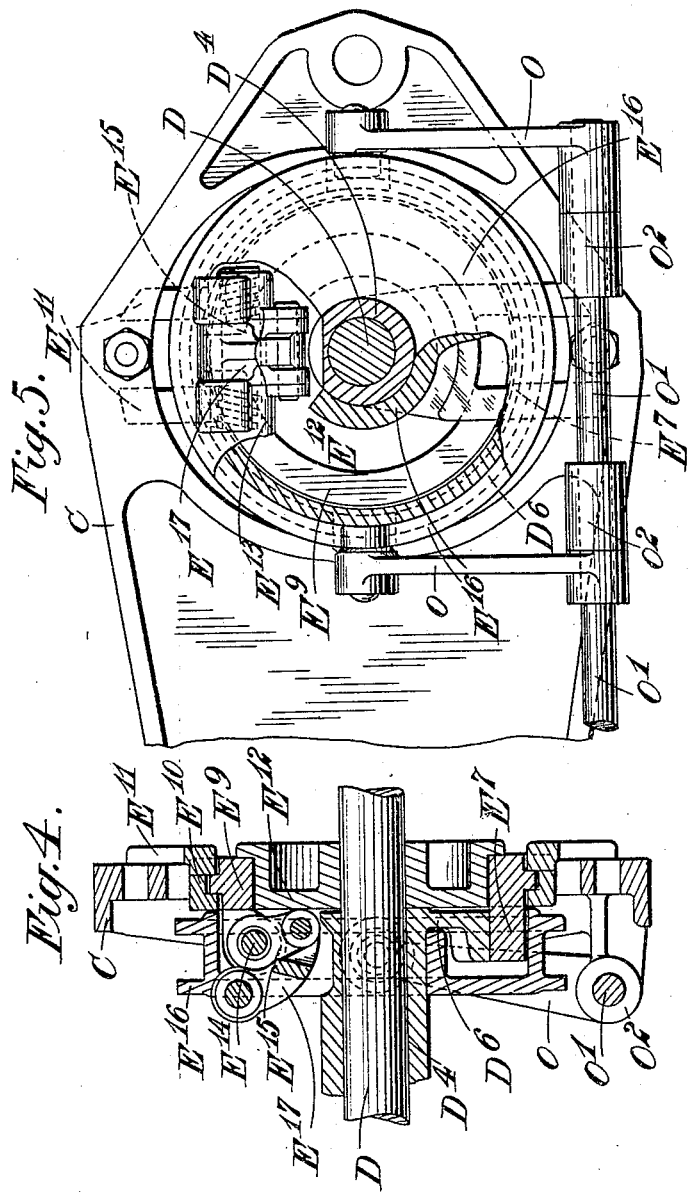

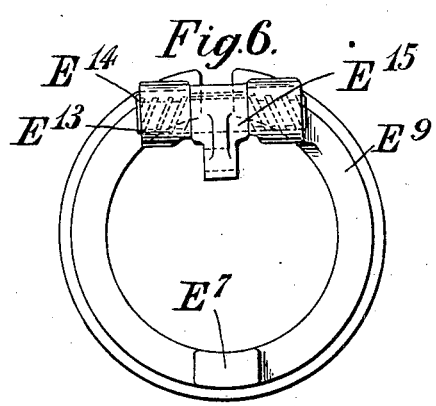

No. 764,104. PATENTED JULY 5, 1904.
T. W. BARBER.
FRICTION CLUTCH.
APPLICATION FILED APR. 3, 1903.
NO MODEL. 5 SHEETS—SHEET 5.
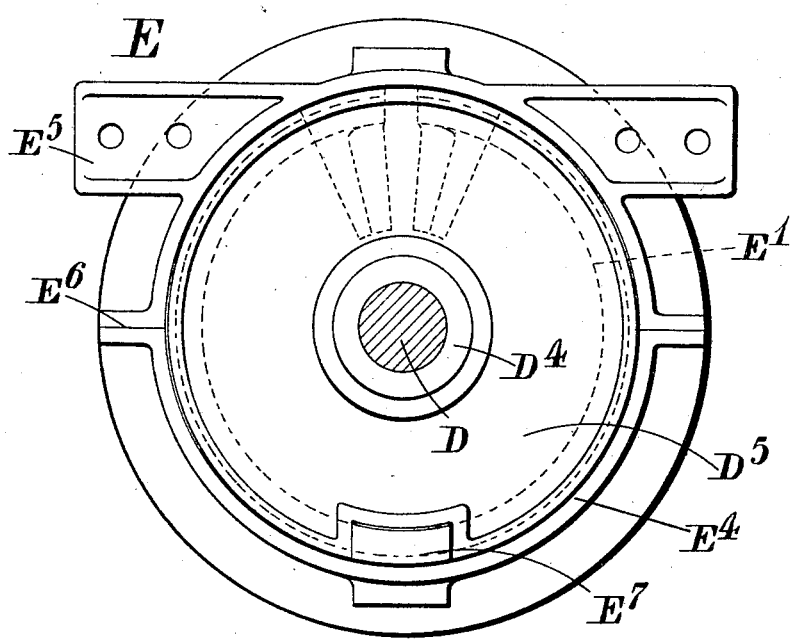

No. 764,104. Patented July 5, 1904.

UNITED STATES PATENT OFFICE.

THOMAS WALTER BARBER, OF LONDON, ENGLAND.

FRICTION-CLUTCH.

SPECIFICATION forming part of Letters Patent No. 764,104, dated July 5, 1904.

Application filed April 3, 1903. Serial No. 150,888. (No model.)

*To all whom it may concern:*

Be it known that I, THOMAS WALTER BARBER, a subject of the King of England, residing at London, England, have invented certain new and useful Improvements in or Relating to Friction-Clutches, of which the following is a specification.

This invention relates to friction-clutches of that class in which a split ring carried by one member is contracted upon a second member from or to which movement is required to be imparted.

In carrying out this invention the split ring is preferably secured to the member to be driven and is adapted to be contracted upon a driving member. The split ring is further surrounded by a fixed braking-surface, so that when not contracted upon the driving member it may be expanded until brought into contact with the braking-surface. By this means the driven member may be either put into engagement with the driving member so that it rotates with the latter or with the fixed braking-surface. When the split ring is in middle position—that is, either in engagement with the driving member or fixed braking member—the driven member is entirely free.

This clutch may be employed wherever it is desired to engage a driven member with or disengage it from a driving member, and is particularly adapted for connecting the driving-shaft of a motor-vehicle with the road-wheels of a vehicle where it is desired to disconnect the engine instantaneously should this be necessary. The double action of the split ring is particularly suitable for this purpose, as by this means one movement only is required to disconnect the engine and apply the brake.

Various means may be employed for contracting or expanding the split ring—for instance, cam or wedge shaped lugs are formed on the free ends of the ring and adapted to engage correspondingly-shaped grooves or spaces between suitably-shaped projections on a member free to be advanced toward or withdrawn from the split ring. The advance or withdrawal of this member forces the ends of the ring farther apart or draws them together. According to another method of contracting or expanding the split ring lugs are mounted on the free ends of the ring and connected by a right and left hand screw-threaded spindle, mechanism being provided by which the driver can rotate the spindle in either direction at will, so that the split ring is expanded or contracted, according to the direction in which the spindle is caused to rotate.

In the accompanying drawings, which illustrate two methods of carrying out this invention, Figure 1 is a plan in part section of one construction of friction-clutch. Fig. 2 is a section of the same on the line 2 2 of Fig. 1. Fig. 3 is a vertical section of the clutch. Fig. 4 is a vertical axial section of a modified form of clutch mounted in an oscillating frame for a motor-vehicle. Fig. 5 is an end elevation of the same in part section. Fig. 6 is an elevation of the split ring used in this form of clutch, and Fig. 7 is an end view of Fig. 3 viewed from the left.

Like letters indicate like parts throughout the drawings.

The split ring $E'$ of the clutch shown in Figs. 1 to 3 and Fig. 7 is provided with a groove $E^2$ in its outer periphery, which engages a corresponding rib $E^3$ on a cylindrical member $E^4$, which surrounds the split ring and by which the latter is carried. The member $E^4$ is provided with lugs $E^5$, by which it may be securely bolted to any suitable support, such as the frame of a motor-vehicle. The cylindrical member $E^4$ is conveniently made in two parts connected at $E^6$. Concentric with the split ring E and adapted to be engaged by it is mounted a drum $D^3$, fast upon a driving-shaft D. Free on the same shaft is a sleeve $D^4$, which may carry the road-wheel of a vehicle or be connected with any mechanism the shaft D is required to drive. That end of the sleeve $D^4$ nearest the drum $D^3$ conveniently abuts against the drum and carries a drum $D^5$. The drum $D^5$ is free to rotate within the stationary cylindrical member $E^4$ and is provided on its periphery with a recess adapted to receive a lug $E^7$ on the split ring $E'$. The lug is conveniently on that side of the split ring opposite the split portion and forms a permanent connection between the ring and the sleeve $D^4$. To the free ends of the split ring $E'$ cam or wedge shaped projections $E^8$ are secured. Close to these cam-shaped projections a wedge-shaped lug $N'$ and side lugs $N^2$ are mounted. The blocks or lugs $N'$ $N^2$ are secured to a clutch-ring $N$, provided with a boss $N^3$, free to slide upon the driving-shaft $D$ or upon the expanded boss of the drum $B^3$. The wedge-shaped lug $N'$ is secured to the boss $N^3$ of the clutch-ring by bolts or screws $N^4$, which engage slotted holes in the lug. The side lugs $N^2$ may be secured to the boss of the clutch-ring by screws engaging slotted holes in the same manner as the central lug $N'$, and the spaces between the central lug and the side lugs constitute grooves adapted to receive the projections $E^8$ on the split ring $E'$.

The operation of this clutch is as follows: With the parts in the position shown in the drawings, the clutch-ring $E'$ lies between the drum $D^3$ and the cylindrical member $E^4$ without engaging either, so that a free wheel is obtained. If now the clutch-ring $N$ is moved in a direction away from the split ring $E'$, the side lugs $N^2$ on the clutch-ring will engage the adjacent surfaces of the projections $E^8$ on the split ring and contract the ring upon the drum $D^3$, which being fast on the shaft $D$ causes the ring $E'$ and sleeve $D^4$ to revolve with the shaft, presuming the latter to be rotating. By a movement of the clutch-ring in the opposite direction—that is, toward the split ring—the side lugs $N^2$ on the clutch-ring release the projections $E^8$ on the split ring, so that the latter is loosened from the drum $D^3$ and the wedge-shaped lug $N'$, entering the space between the projections $E^8$, drives them still farther asunder. As the clutch-ring $N$ is farther advanced toward the split ring $E'$ the free ends of the ring are forced farther apart and extended against the interior of the cylindrical member $E^4$. This member, being rigidly secured to the frame of the vehicle, serves as a braking-surface by which the rotation of the sleeve $D^4$, with its connected parts, is retarded. The screw-holes in the lugs $N'$ $N^2$ are slotted to permit adjustment of the lugs for the purpose of taking up wear. By this means the wedge-shaped lug may be adjusted away from the body of the clutch-ring $N$ and a grub-screw $N^5$ is provided for maintaining the adjustment when made. Similarly the side lugs $N^2$ may be adjusted toward the central lug $N'$, and adjusting-screws $N^6$, carried by flanges on the clutch-ring, prevent these lugs from being displaced after adjustment.

Figs. 4 to 6 show a modified form of clutch, in which the split ring is contracted and expanded by means of a right and left handed screw-threaded spindle. The sleeve $D^4$ is not provided in this case with a drum $D^5$, but carries an arm $D^6$, provided with a recess to receive a lug $E^7$ of a split ring $E^9$. The split ring $E^9$ is mounted in a grooved ring $E^{10}$, carried by a frame $C$. The frame $C$, of which part only is shown, is intended to represent a frame of a motor-vehicle suspended by yielding connections from the main frame. The frame $C$ carries the engines by which the vehicle is driven, and is free to vibrate about the shaft $D$, which is carried in rigid bearings on the main frame of the vehicle. The grooved ring $E^{10}$ is connected with the frame by forked projections $E^{11}$, adapted to engage convenient projections on the frame, so that the latter may move relatively to the grooved member while at the same time preventing the ring $E^{10}$ from rotating. Fast on the shaft $D$ and within the split ring $E^9$ is a drum $E^{12}$. In place of the cam-shaped projections $E^8$ on the free ends of the split ring lugs $E^{13}$ are mounted on these ends and screw-threaded to receive a right and left hand screw $E^{14}$. To the screw $E^{14}$ is secured an arm $E^{15}$, pivoted at its free end to a clutch-ring $E^{16}$ by a link $E^{17}$. The clutch-ring $E^{16}$ is free to slide upon the sleeve $D^4$ in the direction of its axis and as it is moved in one direction or the other swings the arm $E^{15}$ and rotates the screw $E^{14}$. According to the direction in which the screw $E^{14}$ is rotated the split ring $E^9$ will be contracted upon the drum $E^{12}$ or expanded against the friction member $E^{10}$. When in the middle position, the split ring engages neither the drum $E^{12}$ nor the friction member $E^{10}$, so that this clutch allows the sleeve $D^4$ to be driven from the shaft $D$, to run free upon the shaft $D$, or to be braked against a fixed brake member, as in the case of the clutch formerly described.

Any convenient means may be employed for sliding the clutch-ring $N$ or $E^{16}$. For this purpose arms $O$ are shown carried by a rock-shaft $O'$ and engaging the groove of the clutch-ring. The shaft $O'$ is carried in bearings $C^2$, secured to a convenient portion of the frame $C$, and mechanism forming no part of this invention may be provided for rocking the shaft $O'$ in one direction or the other.

What I claim as my invention, and desire to secure by Letters Patent, is—

1. In a clutch mechanism the combination of a revoluble driving member, a revoluble driven member mounted in axial line therewith, a stationary member having an interior braking-surface concentric with and surrounding one of the aforesaid revoluble members but free of the same, a split ring surrounding the revoluble member inclosed by the braking member, means for contracting the split ring upon the revoluble member it surrounds, means for expanding it against the braking member and a lug rigidly secured to the side face of the ring and engaging a recess in the revoluble member not surrounded by the ring so that no driving strain is put upon the mechanism for contracting or expanding the ring, as set forth.

2. In a clutch mechanism the combination of a revoluble driving member, a revoluble driven member mounted in axial line therewith, a stationary member having an interior braking-surface concentric with and surrounding one of the aforesaid revoluble members but free of the same, a split ring surrounding the revoluble member inclosed by the braking member and having a reduced peripheral portion on one of its working faces adapted to engage a correspondingly-shaped portion on the face of the member opposed to such part, means for contracting the split ring upon the revoluble member it surrounds, means for expanding it against the braking member, and a lug rigidly secured to the side face of the ring and engaging a recess in the revoluble member not surrounded by the ring so that no driving strain is put upon the mechanism for contracting or expanding the ring as set forth.

3. In a clutch mechanism the combination of a revoluble driving member, a revoluble driven member mounted in axial line therewith, a stationary member having an interior braking-surface concentric with and surrounding one of the aforesaid revoluble members but free of the same, a split ring surrounding the revoluble member inclosed by the braking member and engaging the braking member by a peripheral groove in one of these engaging parts and a corresponding rib on the other so that lateral displacement is prevented and the frictional action increased, means for contracting the split ring upon the revoluble member it surrounds, means for expanding it against the braking member, and a lug rigidly secured to the side face of the ring and engaging a recess in the revoluble member not surrounded by the ring so that no driving strain is put upon the mechanism for contracting or expanding the ring, as set forth.

4. In a clutch mechanism, the combination of a revoluble driving member, a revoluble driven member mounted in axial line therewith, a stationary member having an interior braking-surface concentric with and surrounding one of the aforesaid revoluble members but free of the same, a split ring surrounding the revoluble member inclosed by the braking member and engaging the braking member by a peripheral groove in one of these engaging parts and a corresponding rib on the other so that lateral displacement is prevented and the frictional action is increased, a lateral projection on each end of the split ring, a clutch-ring concentric with the split ring and opposed to the lateral projections, a wedge-shaped projection on the face of the clutch-ring nearest the split ring, the narrow end of the wedge facing the split ring and lying between the projections upon it, lugs on the clutch-ring having those faces which are toward the wedge-shaped member parallel to the sides of the wedge-shaped member so that the projections on the split ring are free to slide between the lugs on the wedge-shaped member, and a lug rigidly secured to the side face of the ring and engaging a recess in the revoluble member not surrounded by the ring so that no driving strain is put upon the mechanism for contracting or expanding the ring as set forth.

5. In a clutch mechanism, the combination of a revoluble driving member, a revoluble driven member mounted in axial line therewith, a stationary member having an interior braking-surface concentric with and surrounding one of the aforesaid revoluble members but free of the same, a split ring surrounding the revoluble member inclosed by the braking member and engaging the braking member by a peripheral groove in one of these engaging parts and a corresponding rib on the other so that lateral displacement is prevented and the frictional action is increased, a lateral projection on each end of the split ring, a clutch-ring concentric with the split ring and opposed to the lateral projections, a boss on the clutch-ring on that side nearest the split ring, a wedge-shaped projection on the face of the clutch-ring nearest the split ring, the narrow end of the wedge facing the split ring and lying between the projections upon it, screws for securing the wedge-shaped projection to the boss of the clutch-ring with its narrow end inserted between the projections on the split ring, said screws passing through slotted holes to permit adjustment of the wedge-shaped projection in a direction toward or away from the clutch-ring, lugs on the clutch-ring having those faces which are toward the wedge-shaped member parallel to the sides of the wedge-shaped member so that the projections on the split ring are free to slide between the lugs on the wedge-shaped member, and a lug rigidly secured to the side face of the ring and engaging a recess in the revoluble member not surrounded by the ring so that no driving strain is put upon the mechanism for contracting or expanding the ring as set forth.

6. In a clutch mechanism, the combination of a driving-shaft, a drum fast on the driving-shaft, a sleeve free on the driving-shaft, a road-wheel on the sleeve, a split ring surrounding the drum and engaging the sleeve on the shaft by a peripheral groove and a corresponding rib on the respective parts so that lateral displacement is prevented and frictional action is increased, a lateral projection on each end of the split ring, a clutch-ring concentric with the split ring and opposed to the lateral projections, a boss to the clutch-ring on that side nearest the split ring, a wedge-shaped projection secured to the boss on the clutch-ring, the narrow end of the wedge facing the split ring and lying between the projection upon it, lugs on the clutch-ring having those faces which are toward the wedge-shaped member parallel to the sides of the wedge-shaped member so that the projections on the split ring are free to slide between the lugs on the wedge-shaped member, screws for securing the lugs to the boss of the clutch-ring and passing through slotted holes in the lugs, whereby to permit adjustment toward or away from the wedge-shaped projection, and a lug rigidly secured to the side face of the ring and engaging a recess in the drum not surrounded by the ring so that no driving strain is put upon the mechanism for contracting or expanding the ring, as set forth.

In testimony whereof I have signed my name to this specification in the presence of two subscribing witnesses.

THOMAS WALTER BARBER.

Witnesses:
    E. W. WALFORD,
    A. M. HAYWARD.